(12) United States Patent
Ramage et al.

(10) Patent No.: US 8,013,082 B2
(45) Date of Patent: Sep. 6, 2011

(54) PROCESSES FOR CORRELATING UV-VIS SPECTRA OF NORBORNENE COMPOUND TO POLYMERIZATION PROCESSES USING THE SAME, AND RELATED PURIFICATION METHODS AND COMPOSITIONS

(75) Inventors: David L. Ramage, Lake Jackson, TX (US); Sarah L. Martin, Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 134 days.

(21) Appl. No.: 12/373,776

(22) PCT Filed: Jul. 13, 2007

(86) PCT No.: PCT/US2007/016017
§ 371 (c)(1),
(2), (4) Date: Jan. 14, 2009

(87) PCT Pub. No.: WO2008/010962
PCT Pub. Date: Jan. 24, 2008

(65) Prior Publication Data
US 2009/0312511 A1    Dec. 17, 2009

Related U.S. Application Data

(60) Provisional application No. 60/831,404, filed on Jul. 17, 2006.

(51) Int. Cl.
*C08F 2/00* (2006.01)
*C07C 7/00* (2006.01)
*C08F 236/20* (2006.01)

(52) U.S. Cl. .......... 526/77; 526/282; 585/800; 585/821; 436/139

(58) Field of Classification Search .................... 526/77, 526/282; 585/800, 821; 436/139
See application file for complete search history.

(56) References Cited

U.S. PATENT DOCUMENTS

| 3,879,361 | A |   | 4/1975  | Wyatt et al.       |        |
|-----------|---|---|---------|--------------------|--------|
| 4,306,041 | A |   | 12/1981 | Cozewith et al.    |        |
| 4,727,204 | A |   | 2/1988  | Suzukamo et al.    |        |
| 5,270,407 | A | * | 12/1993 | Takeuchi et al.    | 526/74 |
| 6,147,025 | A |   | 11/2000 | Gillis et al.      |        |
| 6,329,477 | B1| * | 12/2001 | Harrington et al.  | 526/65 |
| 6,486,276 | B1|   | 11/2002 | Wang et al.        |        |
| 2002/0156334 | A1 | | 10/2002 | Seo              |        |

FOREIGN PATENT DOCUMENTS

| EP | 0230025 A1   | 7/1987  |
|----|--------------|---------|
| EP | 1162214 A1   | 12/2001 |
| GB | 1400438 A    | 7/1975  |
| WO | WO-9516716 A1| 6/1995  |

OTHER PUBLICATIONS

Applied Analytics, Inc. advertised (Process Anaylzers Newsletter, Feb. 2006) (3 pages).

* cited by examiner

*Primary Examiner* — Fred M Teskin

(57) ABSTRACT

The invention provides a process of polymerizing ethylene and at least one α-olefin, said process comprises polymerizing the ethylene and the at least one α-olefin in the presence of 5-ethylidene-2-norbornene, which comprises low levels of impurities, as determined by the absorbances at the following wavelengths: 320 nm and 343 nm. The invention also provides a method of increasing the catalysts efficiency, and a method of determining the expected catalyst efficiency, each in a polymerization of ethylene and at least one α-olefin in the presence of the 5-ethylidene-2-norbornene, which comprises low levels of impurities, as determined by the absorbances at the above wavelengths. The invention further provides a method of purifying 5-ethylidene-2-norbornene to form a purified 5-ethylidene-2-norbornene, which comprises low levels of impurities, as determined by the absorbances of the above wavelengths.

43 Claims, 2 Drawing Sheets

PROCESSES FOR CORRELATING UV-VIS SPECTRA OF NORBORNENE COMPOUND TO POLYMERIZATION PROCESSES USING THE SAME, AND RELATED PURIFICATION METHODS AND COMPOSITIONS

REFERENCE TO PRIOR APPLICATION

This application claims the benefit of U.S. Provisional Application No. 60/831,404, filed on Jul. 17, 2006, fully incorporated herein by reference.

BACKGROUND OF THE INVENTION

The invention relates to a process for assessing the purity of 5-ethylidene-2-norbornene, and correlating impurity levels to improved polymerization reactions, including improved catalyst efficiencies. The invention also relates to purification methods, and to compositions comprising 5-ethylidene-2-norbornene and low levels of each impurities. In addition, the invention relates to polymerization processes as described, and to polymers formed from such processes and compositions containing the same.

The diene, 5-ethylidene-2-norbornene (ENB), is a critical raw material for making ethylene-propylene-diene modified (EPDM) polymer in solution and gas phase polymerizations. In these polymerizations, ethylene, propylene and ENB are ter-polymerized to produce the EPDM. In a typical EPDM, the amount of ENB varies from about 0.1 weight percent to about 15 weight percent, depending upon the particular polymer being manufactured.

The ENB is typically manufactured in a two step process. In the first step, cyclopentadiene and butadiene undergo a Diehls-Alder reaction to yield vinyl norbornene. In the second step, the vinyl norbornene is isomerized to ENB with an active metal or a basic catalyst. A reaction schematic of the two-step process is shown below.

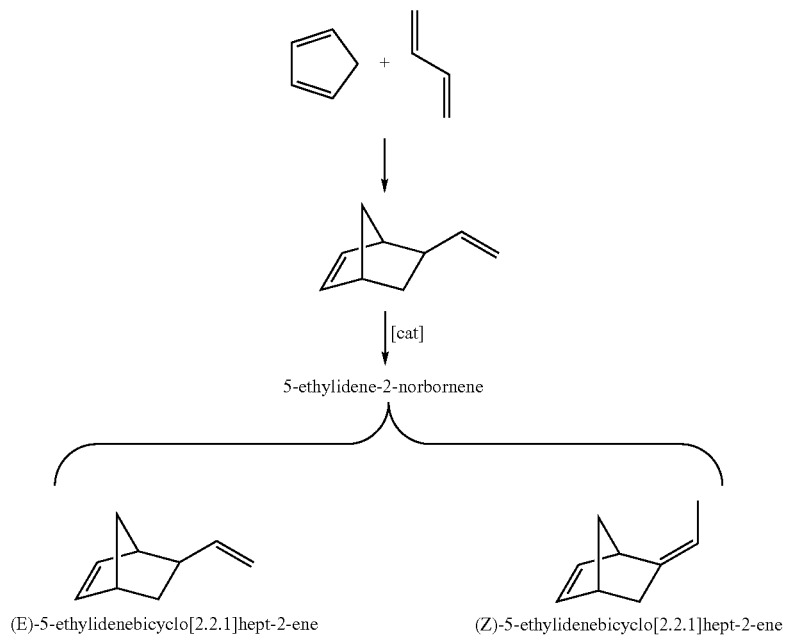

The quality of the ENB is critical for good catalyst efficiency in an EPDM polymerization. Thus, the ENB must be produced and purified, so that residual compounds (like cyclopentadiene), which can act as catalyst poisons, are present at very low levels. Additionally, the ENB must be protected from air, since it is highly reactive with oxygen, which leads to gum formation (polyENB) and oxygenated ENB derivatives. ENB is usually stored in an inert atmosphere, such as nitrogen, to maintain its oxidative stability. In addition, radical scavengers or inhibitors, such as 4-tert-butylcatecol (TBC) and/or 2,6-di-tert-butyl-4-methylphenol (BHT) may be added to the ENB to inhibit side reactions.

The quality of ENB is assessed by a variety of conventional analyses, such as Gas Chromatography (GC), colorimetric analysis and water analysis. The properties measured by these conventional ENB analyses are typically used to set the specification criteria for suitable lots of ENB. However, often lots of ENB that meet the criteria of all of the typically employed analyses, perform poorly in catalyzed polymerization reactions. The failure of conventional ENB analyses to discriminate between ENB that yields acceptable catalyst performance and ENB that does not, indicates that the sensitivities of these conventional analyses are not sufficient to detect inhibitory levels of impurities and/or that these conventional analyses are not measuring all of the impurities that inhibit catalyst efficiency.

Applied Analytics, Inc. advertised (Process Anaylzers Newsletter, February 2006) a rapid, on-line, detection method of impurities in 5-ethylene-2-norbornene by photodiode array spectroscopy. This method was disclosed as being capable of rapidly determining the presence of an impurity by monitoring the absorbance at 320 nm and an internal reference at 343 nm. However, no characterization of the 5-ethylene-2-norbornene, in reference to polymerizations or polymerization catalyst efficiencies was provided.

There is a need to develop more sensitive characterization methods to access the quality of ENB, typically used in lots for polymerization reactions. There is also a need to optimize such polymerization reactions. In addition, there is a further need to develop such methods to monitor ENB purification processes. Moreover, there is a need to examine and correlate the effect(s) of certain ENB impurities, which current analytical tools do not examine, on polymerization catalyst efficiencies. These issues and others are addressed by the following invention.

SUMMARY OF THE INVENTION

The invention provides a process of polymerizing a mixture comprising ethylene, at least one α-olefin and 5-ethylidene-2-norbornene, said process comprising polymerizing the ethylene and the at least one α-olefin in the presence of 5-ethylidene-2-norbornene, which comprises low levels of impurities, as determined by the UV absorbances at the following wavelengths: 320 nm and 343 nm, in a neat sample of the 5-ethylidene-2-norbornene, contained in a quartz sample holder with a one centimeter pathlength; and wherein 5-ethylidene-2-norbornene is monitored by UV absorbance, and the 5-ethylidene-2-norbornene having a sum of absorbances at 320 nm and 343 nm, less than, or equal to, 0.31, is selected for polymerization.

The invention also provides a process of polymerizing, as described above, except the mixture comprising ethylene and 5-ethylidene-2-norbornene. The invention also provides a process of polymerizing, as described above, except the mixture comprising 5-ethylidene-2-norbornene.

The invention also provides a method of increasing a catalyst's efficiency in a polymerization of a mixture comprising ethylene, at least one α-olefin and 5-ethylidene-2-norbornene, said method comprising polymerizing the ethylene and the at least one α-olefin the presence of the 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein 5-ethylidene-2-norbornene is monitored by UV absorbance, and the 5-ethylidene-2-norbornene having a sum of absorbances at 320 nm and 343 nm, less than, or equal to, 0.31, is selected for polymerization.

The invention also provides a method of purifying 5-ethylidene-2-norbornene, said method comprising thermally treating said 5-ethylidene-2-norbornene, optionally under reduced pressure, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the sum of the absorbances at 320 nm and 343 nm is less than, or equal to, 0.31.

The invention also provides a method of purifying 5-ethylidene-2-norbornene, said method comprising passing the 5-ethylidene-2-norbornene through a column, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter path length, and wherein the sum of the absorbances at 320 nm and 343 nm is less than, or equal to, 0.31.

The invention also provides a method of purifying 5-ethylidene-2-norbornene, said method comprising chemically treating the 5-ethylidene-2-norbornene, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the sum of the absorbances at 320 mm and 343 nm is less than, or equal to, 0.31.

The invention also provides a method for determining the "percent expected catalyst efficiency" for a polymerization of a mixture, said mixture comprising ethylene, propylene and 5-ethylidene-2-norbornene, said method comprising:
(1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and
(2) calculating the "percent expected catalyst efficiency (% Expected Cat. Eff.) according to the following equation: % Expected Cat. Eff.=100×(1.185−0.749×SUM). In a further embodiment, 5-ethylidene-2-norbornene is monitored by UV absorbance, and the 5-ethylidene-2-norbornene having a sum of absorbances at 320 nm and 343 nm less than, or equal to, 0.31, is selected for polymerization.

The invention also provides a method for determining the "percent expected catalyst efficiency" for a polymerization of a mixture, said mixture comprising ethylene, an α-olefin and 5-ethylidene-2-norbornene, said method comprising:
(1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and
(2) determining the "percent expected catalyst efficiency (% Expected Cat. Eff.) according to the following equation: % Expected Cat. Eff.=100×(A−B×(SUM)), wherein the coefficients A and B are calculated from a linear regression of measured catalyst efficiencies from polymerization reactions, using 5-ethylidene-2-norbornene of varying summations (SUMS) of the UV absorbances at 320 nm and 343 nm. In a further embodiment, the 5-ethylidene-2-norbornene is monitored by UV absorbance, and 5-ethylidene-2-norbornene having a sum of absorbances at 320 nm and 343 mm less than, or equal to, 0.31, is selected for polymerization.

The invention also provides a composition comprising 5-ethylidene-2-norbornene and an impurity with an absorbance at 320 nm and/or an impurity with an absorbance at 343 nm, and wherein the sum of the absorbances at 320 nm and 343 nm is less than, or equal to, 0.31 of 5-ethylidene-2-norbornene.

DETAILED DESCRIPTION OF THE INVENTION

Figure 1:
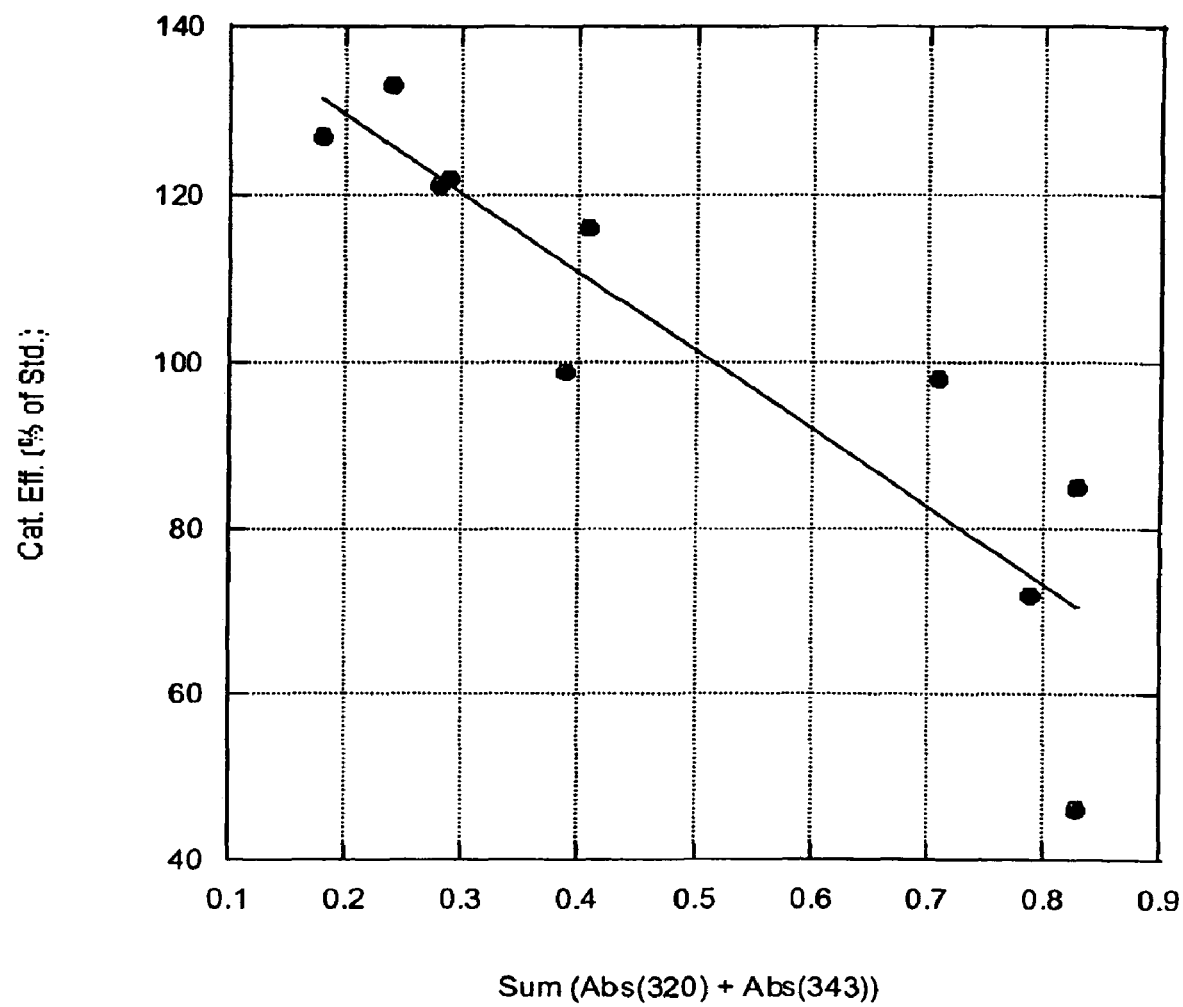
FIG. 1 depicts the correlation of a batch reactor catalyst efficiency to the sum of absorbances at 320 nm and 343 nm of 5-ethylidene-2-norbornene.

The invention is directed to UV-Vis methods for accessing impurity levels in ENB. The invention is also directed to methods for purifying ENB, and to methods for predicting catalyst efficiency levels for polymerization of EPDM polymers. The invention is also directed to polymerization processes and to compositions. It has unexpectedly been discovered that UV-Vis spectroscopy provides better sensitivity for the detection of impurities in ENB, and it has also been discovered that some lots of ENB that meet the criteria of other analyses, but not criteria set on absorbance levels based on UV-Vis spectroscopy, perform poorly in catalyzed polymerization reactions. Certain impurities in ENB, responsible for reduced catalyst efficiency, were also accessed by their UV absorbance wavelength. Any analysis which monitors UV-VIS absorbance can be used in the invention.

As discussed above, the invention provides a process of polymerizing a mixture comprising ethylene, at least one α-olefin and 5-ethylidene-2-norbornene, said process comprises polymerizing the ethylene and the α-olefin in the presence of 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein 5-ethylidene-2-norbornene is monitored by UV absorbance, and the 5-ethylidene-2-norbornene having a sum of absorbances at 320 arm and 343 nm, less than, or equal to, 0.31, is selected for polymerization. "Low levels of impurities," as determined by the absorbances at the following wavelengths: 320 nm and 343 nm, is determined from the sum of absorbances at 320 nm and 343 nm. In another embodiment, the sum of the absorbances at 320 nm and 343 nm is less than, or equal to, 0.25. In another embodiment, the sum of the absorbances at 320 nm and 343 nm is less than, or equal to, 0.18. In a further embodiment, the UV absorbance of the 5-ethylidene-2-norbornene is monitored using a UV-VIS spectrometer.

In another embodiment, the invention provides a process of polymerizing a mixture comprising ethylene, propylene and 5-ethylidene-2-norbornene, said process comprises polymerizing the ethylene and the at least one α-olefin in the presence of 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein 5-ethylidene-2-norbornene is monitored by UV absorbance, and the 5-ethylidene-2-norbornene having a sum of absorbances at 320 nm and 343 nm, less than, or equal to, 0.31, is selected for polymerization. "Low levels of impurities," as determined by the absorbances at the following wavelengths: 320 nm and 343 nm, is determined from the sum of absorbances at 320 nm and 343 nm. In another embodiment, the sum of the absorbances at 320 nm and 343 nm is less than, or equal to, 0.25. In another embodiment, the sum of the absorbances at 320 nm and 343 nm is less than, or equal to, 0.18. In a further embodiment, the UV absorbance of the 5-ethylidene-2-norbornene is monitored using a UV-VIS spectrometer.

In another embodiment, the invention provides a process of polymerizing a mixture comprising ethylene and 5-ethylidene-2-norbornene, said process comprises polymerizing the ethylene in the presence of 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein 5-ethylidene-2-norbornene is monitored by UV absorbance, and the 5-ethylidene-2-norbornene having a sum of absorbances at 320 nm and 343 nm, less than, or equal to, 0.31, is selected for polymerization. "Low levels of impurities," as determined by the absorbances at the following wavelengths: 320 nm and 343 nm, is determined from the sum of absorbances at 320 nm and 343 nm. In another embodiment, the sum of the absorbances at 320 nm and 343 nm is less than, or equal to, 0.25. In another embodiment, the sum of the absorbances at 320 nm and 343 nm is less than, or equal to, 0.18. In a further embodiment, the UV absorbance of the 5-ethylidene-2-norbornene is monitored using a UV-VIS spectrometer.

In another embodiment, the invention provides a process of polymerizing a mixture comprising 5-ethylidene-2-norbornene, said process comprises polymerizing 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the 5-ethylidene-2-norbornene is monitored by UV absorbance, and the 5-ethylidene-2-norbornene having a sum of absorbances at 320 nm and 343 nm, less than, or equal to, 0.31, is selected for polymerization. In another embodiment, the sum of the absorbances at 320 nm and 343 nm is less than, or equal to, 0.25. In another embodiment, the sum of the absorbances at 320 nm and 343 nm is less than, or equal to, 0.18. "Low levels of impurities," as determined by the absorbances at the following wavelengths: 320 nm and 343 nm, is determined from the sum of absorbances at 320 nm and 343 nm. In a further embodiment, the UV absorbance of the 5-ethylidene-2-norbornene is monitored using a UV-VIS spectrometer.

For an inventive polymerization, the α-olefin is preferably selected from the group consisting of C3-C20 α-olefins, C3-C12 α-olefins, and C3-C8 α-olefins, and more preferably C3-C8 α-olefins. In a further aspect, the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene. Preferably the α-olefin is selected from propylene, 1-butene, 1-hexene and 1-octene, and more preferably the α-olefin is propylene.

In another embodiment, the polymerization takes place in solution. In yet another embodiment, the polymerization takes place in the gas phase. In yet another embodiment, the polymerization takes place in the presence of at least one constrained geometry catalyst.

In another embodiment, the polymerization takes place in the presence of at least one Ziegler-Natta catalyst. In another embodiment, the polymerization takes place in the presence of at least one single-site catalyst. In another embodiment, the polymerization takes place in the presence of at least one multiple-site catalyst.

In another embodiment, the polymerization takes place in a batch reactor. In yet another aspect, the polymerization takes place in a reactor selected from the group consisting of a pilot plant reactor, a laboratory scale reactor, a high throughput polymerization reactor, and a commercial reactor.

In another embodiment, the 5-ethylidene-2-norbornene is monitored by UV absorbance using an "on-line" UV or UV-VIS spectrometer, which is located before the polymerization reactor.

An inventive polymerization may comprise a combination of two or more embodiments as described herein.

The invention also provides a polymer formed from an inventive polymerization as described herein. An inventive polymer may comprise a combination of two or more embodiments as described herein.

The invention also provides a composition comprising a polymer formed from an inventive polymerization as described herein. An inventive composition may comprise a combination of two or more embodiments as described herein.

The invention also provides a method of increasing the catalysts efficiency in a polymerization of a mixture comprising ethylene, at least one α-olefin and 5-ethylidene-2-norbornene, said method comprising polymerizing ethylene and the α-olefin in the presence of the 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein 5-ethylidene-2-norbornene is monitored by UV absorbance, and the 5-ethylidene-2-norbornene having a sum of absorbances at 320 nm and 343 nm, less than, or equal to, 0.31, is selected for polymerization. In another embodiment, the sum of the absorbances at 320 nm and 343 nm is less than, or equal to, 0.25. In another embodiment, the sum of the absorbances at 320 nm and 343 nm is less than, or equal to, 0.18. "Low levels of impurities," as determined by the absorbances at the following wavelengths: 320 nm and 343 nm, is determined from the sum of absorbances at 320 nm and 343 nm. In a further embodiment, the UV absorbance of the 5-ethylidene-2-norbornene is monitored using a UV-VIS spectrometer.

In another embodiment, the α-olefin is selected from the group consisting of C3-C20 α-olefins, C3-C12 α-olefins, and C3-C8 α-olefins, and preferably C3-C8 α-olefins. In a further aspect, the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene. Preferably the α-olefin is selected from propylene, 1-butene, 1-hexene and 1-octene, and more preferably the α-olefin is propylene.

In another embodiment, the polymerization takes place in solution. In yet another embodiment, the polymerization takes place in the gas phase. In yet another embodiment, the polymerization takes place in the presence of at least one constrained geometry catalyst.

In another embodiment, the polymerization takes place in the presence of at least one Ziegler-Natta catalyst. In another embodiment, the polymerization takes place in the presence of at least one single-site catalyst. In another embodiment, the polymerization takes place in the presence of at least one multiple-site catalyst.

In another embodiment, the polymerization takes place in a batch reactor. In yet another embodiment, the polymerization takes place in a reactor selected from the group consisting of a pilot plant reactor, a laboratory scale reactor, a high throughput polymerization reactor, and a commercial reactor.

In another embodiment, the 5-ethylidene-2-norbornene is monitored by UV absorbance using an "on-line" UV or UV-VIS spectrometer, which is located before the polymerization reactor.

An inventive method may comprise a combination of two or more embodiments as described herein.

The invention also provides a method of purifying 5-ethylidene-2-norbornene, said method comprising passing the 5-ethylidene-2-norbornene through a column, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter path length, and wherein the sum of the absorbances at 320 nm and 343 nm is less than, or equal to, 0.31, preferably less than, or equal to, 0.25, and more preferably less than, or equal to, 0.18. Columns include, but are not limited to, silica-based columns, alumina-based columns, and other columns known in the art. In a further embodiment, the UV is monitored using a UV-VIS spectrometer.

The invention also provides a method of purifying 5-ethylidene-2-norbornene, said method comprising thermally treating said 5-ethylidene-2-norbornene, optionally under reduced pressure, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the sum of the absorbances at 320 nm and 343 nm is less than, or equal to, 0.31, preferably less than, or equal to, 0.25, and more preferably less than, or equal to, 0.18. In another aspect, the 5-ethylidene-2-norbornene is thermally treated at ambient pressure or under an increased pressure. In a further embodiment, the UV is monitored using a UV-VIS spectrometer. Reduced pressure is a pressure below atmospheric pressure, and suitable pressures below 150 torr may be used in the purification process. In another embodiment, the 5-ethylidene-2-norbornene is thermally treated at a pressure slightly above atmospheric.

The invention also provides a method of purifying 5-ethylidene-2-norbornene, said method comprising chemically treating the 5-ethylidene-2-norbornene, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the sum of the absorbances at 320 nm and 343 nm is less than, or equal to, 0.31, preferably less than, or equal to, 0.25, and more preferably less than, or equal to, 0.18. In a further embodiment, the UV is monitored using a UV-VIS spectrometer.

An inventive purification method may comprise a combination of one or more suitable embodiments as described herein.

The invention also provides a method for determining the "percent expected catalyst efficiency" for a polymerization of a mixture, said mixture comprising ethylene, an α-olefin and 5-ethylidene-2-norbornene, said method comprising:
(1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and
(2) determining the "percent expected catalyst efficiency (% Expected Cat. Eff.) according to the following equation: % Expected Cat. Eff.=100×(A−B×SUM), wherein the coefficients A and B are calculated from a linear regression of measured catalyst efficiencies from polymerization reactions, using 5-ethylidene-2-norbornene of varying summations (SUMS) of the UV absorbances at 320 nm and 343 nm. In a further embodiment, the UV absorbances are measured using a UV-VIS spectrometer. In the above formula, B is the slope and A is the intercept of the regression line.

One skilled in the art would recognize that coefficients of the equation, % Expected Cat. Eff.=100×(A−B×(SUM)), will be dependent on the polymerization catalyst, the polymerization process and associated variables, including the α-olefin.

Suitable examples of software that can be used to run a linear regression include the "linear curve fit" in KaleidaGraph® (version 4.0) software, available from Synergy Software, and the "trend line linear regression" in EXCEL (version 2003) software, available from MicroSoft®.

In another embodiment, the polymerization takes place in a batch reactor. In yet another embodiment, the polymerization takes place in a reactor selected from the group consisting of a pilot plant reactor, a laboratory scale reactor, a high throughput polymerization reactor, and a commercial reactor.

In another embodiment, the sum of the absorbances at 320 nm and 343 nm is less than, or equal to, 0.31. In another embodiment, the sum of the absorbances at 320 nm and 343 nm is less than, or equal to, 0.25. In another embodiment, the sum of the absorbances at 320 nm and 343 nm is less than, or equal to, 0.18.

In another embodiment, the polymerization takes place in solution. In another aspect, the polymerization takes place in the gas phase. In another aspect, the polymerization takes place in the presence of at least one constrained geometry catalyst.

In another embodiment, the polymerization takes place in the presence of at least one Ziegler-Natta catalyst. In another embodiment, the polymerization takes place in the presence of at least one single-site catalyst. In another embodiment, the polymerization takes place in the presence of at least one multiple-site catalyst.

In yet another embodiment, the invention provides a method for determining the "percent expected catalyst efficiency" for a polymerization of a monomer mixture, said mixture comprising ethylene, propylene and 5-ethylidene-2-norbornene, said method comprising:
(1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and
(2) calculating the "percent expected catalyst efficiency (% Expected Cat. Eff.) according to the following equation: % Expected Cat. Eff.=100×(1.185−0.749×SUM). In a further embodiment, the UV absorbances are measured using a UV-VIS spectrometer.

Suitable examples of software that can be used to run a linear regression include the "linear curve fit" in KaleidaGraph® (version 4.0) software, available from Synergy Software, and the "trend line linear regression" in EXCEL (version 2003) software, available from MicroSoft®.

In another embodiment, the polymerization takes place in a batch reactor. In yet another embodiment, the polymerization takes place in a reactor selected from the group consisting of a pilot plant reactor, a laboratory scale reactor, a high throughput polymerization reactor, and a commercial reactor.

In another embodiment, the sum of the absorbances at 320 nm and 343 nm is less than, or equal to, 0.31. In another embodiment, the sum of the absorbances at 320 nm and 343 nm is less than, or equal to, 0.25. In another embodiment, the sum of the absorbances at 320 nm and 343 nm is less than, or equal to, 0.18.

In another embodiment, the polymerization takes place in solution. In another embodiment, the polymerization takes place in the gas phase. In another embodiment, the polymerization takes place in the presence of at least one constrained geometry catalyst.

In another embodiment, the polymerization takes place in the presence of at least one Ziegler-Natta catalyst. In another embodiment, the polymerization takes place in the presence of at least one single-site catalyst. In another embodiment, the polymerization takes place in the presence of at least one multiple-site catalyst.

In a further embodiment, the invention provides a composition comprising 5-ethylidene-2-norbornene and an impurity with an absorbance at 320 nm and/or an impurity with an absorbance at 343 nm, and wherein the sum of the absorbances at 320 nm and 343 nm is less than, or equal to, 0.31, preferably less than, or equal to, 0.25, and more preferably less than, or equal to, 0.18. In a further embodiment, the UV absorbances are measured using a UV-VIS spectrometer. Any analysis which monitors UV-VIS absorbance can be used in the invention.

The polymerization processes of the invention may comprise two or more embodiments as described herein.

The purification methods of the invention may comprise two or more embodiments as described herein.

The methods for increasing catalyst efficiencies may comprise two or more embodiments as described herein.

The methods for determining catalyst efficiencies may comprise two or more embodiments as described herein.

The polymers of the invention may comprise two or more embodiments as described herein.

The compositions of the invention may comprise two or more embodiments as described herein.

The absorbances at the two wavelengths discussed herein (320 mm and 343 nm) are each the absorbance at the specified wavelength, and not necessarily an absorbance associated with a peak maximum. Any analysis which monitors UV-VIS absorbance can be used in the invention.

As discussed above, the invention provides process improvements for the polymerization of EPDM polymers, which incorporate ENB monomer. Such polymers include, but are not limited to, Nordel™ IP and Nordel™ MG. The invention provides for increased catalyst efficiency, increased ENB purification bed lifetimes, increased reactor stability, and facilitates the manufacture of polymer with higher levels of incorporated ENB. These improvements are obtained by monitoring and selecting ENB that contains low levels of impurities that are responsible for UV-V is absorbances at 320 nm and 343 nm wavelengths. More specifically, the sum of the absorbances at these wavelengths is less than 0.31, more preferably less than 0.25, and most preferably less than 0.18 absorbance units, when the ENB is analyzed using a UV-Vis spectrometer or process analyzer.

In principle many wavelengths below 375 nm (to the limit of quartz transparency) could be used to access ENB quality. The two wavelengths of 320 and 343 nm were chosen, because neat samples of ENB in "1 cm path length" cells were analyzed. Wavelengths below 320 nm could be used to develop similar correlations with samples of ENB diluted by a process solvent that is transparent at those wavelengths, or using cells with shorter path lengths. Under those conditions, the intensity of the absorbances centered around 343 nm would be less useful. Likewise a number of wavelengths around 343 nm could be useful when using a cell with a one centimeter path length or larger. This invention incorporates the variations in practice described above.

The inventive methods described herein can be used to provide a specification for incoming ENB. The inventive methods may also be used to monitor the purity level of ENB in a purification process, such as in a distillation of ENB. Here, the final distillate of the ENB can be controlled, so that the sum of the absorbances is below one of the desired threshold values given above. This can be accomplished by sampling the outlet of an ENB finishing column, or most preferably, by the use of an online UV-Vis process analyzer.

The invention also provides for a method to estimate the relative effect of the ENB impurity levels on catalyst efficiency in the polymerization of an interpolymer. For example, as discussed above, the invention provides a method for determining the "percent expected catalyst efficiency" for a polymerization of a mixture, said mixture comprising ethylene, an α-olefin and 5-ethylidene-2-norbornene.

The invention also provides for a method to estimate the relative effect of the ENB impurity levels on catalyst efficiency in the polymerization of an EPDM polymer, such as a Nordel™ polymer. As discussed above, this method correlates the catalysts efficiency with the sum of absorbances at 320 nm ($A_{320}$) and 343 nm ($A_{343}$) using the equation (I):

% Expected Cat. Eff.=100(1.185−0.749×($A_{320}$+$A_{343}$))　　　(I).

This equation was developed by correlating the sum of the absorbances to batch reactor catalyst efficiencies.

When an inventive process or method, or inventive composition, requires an α-olefin, it is preferably selected from the group consisting of C3 to C20 α-olefins, C3 to C12 α-olefins, and C3-C8 α-olefins, and more preferably C3-C8 α-olefins. In a further embodiment, the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene, and preferably propylene, 1-butene, 1-hexene and 1-octene. In a preferred embodiment, the α-olefin is propylene.

In one embodiment, the polymerization takes place in solution. In yet another embodiment, the polymerization takes place in the gas phase.

In another embodiment, the polymerization takes place in the presence of at least one constrained geometry catalyst.

In another embodiment, the polymerization takes place in the presence of at least one Ziegler-Natta catalyst. In another embodiment, the polymerization takes place in the presence of at least one single-site catalyst. In another embodiment, the polymerization takes place in the presence of at least one multiple-site catalyst.

In another embodiment, the invention provides a composition comprising 5-ethylidene-2-norbornene and an impurity with an absorbance at 320 nm and/or an impurity with an absorbance at 343 nm, and wherein the sum of the absorbances at 320 nm and 343 nm is less than, or equal to, 0.31. In a further embodiment, the sum of the absorbances at 320 nm and 343 nm is less than, or equal to, 0.25. In yet a further embodiment, the sum of the absorbances at 320 nm and 343 nm is less than, or equal to, 0.18.

The interpolymers of the present invention have polymerized therein ethylene at least one α-olefin and 5-ethylidene-2-norbornene. The α-olefin is preferably a C3-C20 aliphatic compound, more preferably a C3-C12 aliphatic compound, and even more preferably a C3-C8 aliphatic compound. Preferred α-olefins include propylene, 1-butene, 1-pentene, 1-hexene, 3-methyl-1-pentene, 4-methyl-1-pentene, 1-heptene, 1-octene, 1-decene and 1-dodecene. More preferred α-olefins include propylene, 1-butene, 1-hexene and 1-octene, and more preferably propylene. In another embodiment, the interpolymer has polymerized therein ethylene and 5-ethylidene-2-norbornene.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "5-ethylidene-2-norbornene (or ENB)," as used herein, refers to two isomeric forms of 5-ethylidene-2-norbornene ((E)-5-ethylidenebicyclo[2.2.1]hept-2-ene and (Z)-5-ethylidenebicyclo[2.2.1]hept-2-ene). Commercial products of 5-ethylidene-2-norbornene (or ENB) typically have a purity in the range of 95 wt % to 99.9 wt %, and where the level of purity is based on the amounts of the two isomeric forms of 5-ethylidene-2-norbornene.

The term "impurities," as used herein, in reference to the UV absorbances at 320 nm and 343 nm, refer to one or more chemical compounds that are not chemically equivalent to 5-ethylidene-2-norbornene, but have UV absorbance at 320 nm and/or 343 nm.

The term "neat sample of 5-ethylidene-2-norbornene," as used herein, refers to the chemical product (5-ethylidene-2-norbornene) formed from a chemical synthesis of 5-ethylidene-2-norbornene, and subsequent purification(s) of the formed 5-ethylidene-2-norbornene, and which does not contain any additional artificial chemical(s) that did not result from the chemical synthesis and/or purification(s). However, this term may include chemical(s) commonly added as antioxidants to 5-ethylidene-2-norbornene, such as BHT and TBC. Typically only one antioxidant is added at less than 200 ppm (based on the total weight of 5-ethylidene-2-norbornene plus antioxidant).

In one embodiment, the interpolymers of the present invention have an ethylene content from 20 up to 95 weight percent, more preferably from 30 to 93 weight percent, and most preferably from 35 to 90 weight percent, based on the sum weight of the monomeric constituents. The interpolymers may also contain at least one α-olefin, at a level of 5 to 80 weight percent, more preferably at 7 to 70 weight percent, and most preferably from 10 to 65 weight percent, based on the sum weight of the monomeric constituents.

In another embodiment, the amount of ENB in the interpolymers of the invention is from 0.1 to 15 weight percent, preferably from 0.25 to 10 weight percent, and more preferably from 0.5 to 8 weight percent, based on the sum weight of monomeric constituents.

In another embodiment, the amount of ENB in the interpolymers of the invention is from 0.5 to 15 weight percent, preferably from 1 to 10 weight percent, and more preferably from 2 to 8 weight percent, based on the sum weight of monomeric constituents.

In general, polymerization may be accomplished at conditions well known in the art for Ziegler-Natta or Kaminsky-Sinn type polymerization reactions, that is, temperatures from 0° C. to 250° C., preferably from 30° C. to 200° C., and pressures from atmospheric to 10,000 atmospheres.

Polymerizations may be performed using a suspension, solution, slurry, or gas phase polymerization, or combinations thereof. In a preferred embodiment, the polymerization is conducted in a solution reactor, or is conducted in a gas phase reactor. In a preferred embodiment, a solution of one or more catalysts is used in a polymerization reactor, and for example, in a solution polymerization or in a gas phase polymerization. In another embodiment, the catalyst or a combination of catalysts is supported on a support, such as, silica, alumina, or a polymer (especially poly(tetrafluoroethylene) or a polyolefin), and may be spray dried onto such supports, and introduced in supported form into a polymerization reactor.

The polymerization may take place in any suitable type of reactor, and preferably a reactor design that would allow one skilled in the art to determine catalyst efficiency. Reactors include, but are not limited to, batch reactors, continuous reactors, pilot plant reactors, a laboratory scale reactors, a high throughput polymerization reactors, and other types of commercial reactors.

Inert liquids are suitable solvents for polymerization. Examples include straight-chain and branched-chain hydrocarbons, such as isobutane, butane, pentane, hexane, heptane, octane, nonane, decane, and mixtures thereof; cyclic and alicyclic hydrocarbons, such as cyclohexane, cycloheptane, methylcyclohexane, methylcycloheptane, and mixtures thereof; perfluorinated hydrocarbons, such as perfluorinated C4-C10 alkanes; and aromatic and alkyl-substituted aromatic compounds, such as benzene, toluene, xylene, and ethylbenzene. Suitable solvents also include liquid olefins that may act as monomers or comonomers, including butadiene, cyclopentene, 1-hexene, 4-vinyl-cyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure, and used herein.

Catalysts

Suitable catalysts for use herein, preferably include constrained geometry catalysts, as disclosed in U.S. Pat. Nos. 5,272,236 and 5,278,272, which are both fully incorporated herein by reference. The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex, comprising a metal of groups 3-10 or the Lanthanide series of the Periodic Table of the Elements, and a delocalized π-bonded moiety, substituted with a constrain-inducing moiety, said complex having a constrained geometry about the metal atom, such that the angle at the metal between the centroid of the delocalized, substituted π-bonded moiety, and the center of at least one remaining substituent, is less than such angle in a similar complex, containing a similar π-bonded moiety lacking in such constrain-inducing substituent. In addition, for such complexes comprising more than one delocalized, substituted π-bonded moiety, only one thereof, for each metal atom of the complex, is a cyclic, delocalized, substituted π-bonded moiety. The catalyst further comprises an activating cocatalyst.

Preferred catalyst complexes correspond to the Structure I:

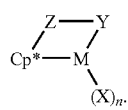

Structure I

In Structure I, M is a metal of group 3-10, or the Lanthanide series of the Periodic Table of the Elements;

Cp* is a cyclopentadienyl or substituted cyclopentadienyl group bound in an η5 bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4, and is 2 less than the valence of M; and

Y is an anionic or nonanionic ligand group, bonded to Z and M, comprising nitrogen, phosphorus, oxygen or sulfur, and having up to 20 non-hydrogen atoms, optionally Y and Z together form a fused ring system. More specific complexes are described in U.S. Pat. Nos. 5,272,236 and 5,278,272, incorporated herein by reference.

Specific compounds include: (tert-butylamido) (tetramethyl-η5-cyclopentadienyl)-1,2-ethanediylzirconium dichloride, (tert-butylamido) (tetramethyl-η5-η5-cyclopentadienyl) 1,2-ethanediyltitanium dichloride, (methylamido) (tetramethyl-η5-cyclopentadienyl)-1,2-ethanediylzirconium dichloride, (methylamido) (tetramethyl-η5 cyclopentadienyl)-1,2-ethanediyltitanium dichloride, (ethylamido)(tetramethyl-η5-cyclopentadienyl)-methylenetitanium dichloro, (tertbutylamido)dibenzyl(tetramethyl-η5-cyclopentadienyl) silanezirconium dibenzyl, (benzylamido)dimethyl(tetramethyl-η5-cyclopentadienyl)silanetitanium dichloride, (t-butlyamido) dimethyl(η5-2-methyl-s-indacen-1-yl) silanetitanium 1,3-pentadiene, (phenylphosphido) dimethyl(tetramethyl η15-cyclopentadienyl)silanezirconium dibenzyl, (tertbutylamido)dimethyl(tetramethyl-η15-cyclopentadienyl) silanetitanium dimethyl, and the like.

The complexes may be prepared by contacting a derivative of a metal, M, and a Group I metal derivative or Grignard derivative of the cyclopentadienyl compound, in a solvent, and separating the salt byproduct. Suitable solvents for use in preparing the metal complexes, include, but are not limited to, aliphatic or aromatic liquids, such as cyclohexane, methylcyclohexane, pentane, hexane, heptane, tetrahydrofuran, diethyl ether, benzene, toluene, xylene, ethylbenzene, or mixtures thereof.

Suitable cocatalysts for use herein include polymeric or oligomeric aluminoxanes, especially methyl aluminoxane, as well as inert, compatible, noncoordinating, ion forming compounds. The so-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made, as disclosed in U.S. Pat. Nos. 5,542,199; 4,544,762; 5,015,749; and 5,041,585, each of which is fully incorporated herein by reference. Preferred cocatalysts are inert, noncoordinating, boron compounds, or aluminoxanes.

In addition to constrained geometry catalysts, additional single site catalyst systems and multiple site catalyst systems that are suitable for use herein, include metallocene catalyst systems and post metallocene catalyst systems. As discussed above, Ziegler-Natta catalyst systems may also be used herein. Preferred catalyst systems for use herein require low levels of aluminoxanes or other aluminum alkyls.

Analytical Methods

In one embodiment of the invention, neat ENB from a finishing column outlet, or a sample of incoming ENB, is analyzed by UV-Vis spectroscopy. The sample is collected, without exposure to air, by use of air-free sampling techniques. The sample is then loaded into a quartz cuvette with a one centimeter pathlength, under an inert atmosphere, and the cuvette is then sealed against air intrusion, and analyzed by UV-V is spectroscopy. Most preferably a similar analysis is performed by an on-line process analyzer located at the outlet of an ENB manufacturer's finishing distillation column. The pathlength of the on-line analyzer must be either one centimeter, or a pathlength, such that the relationship between the individual absorbances and the batch reactor catalyst efficiencies, obtained with differing samples, is sufficiently linear. The material of construction of the flow cell in the unit must be quartz.

In another embodiment of the invention, the analytical method can be used in conjunction with other purification processes, including, but not limited to, liquid or gas distillation processes, other chromatographic processes, chemical reaction or chemical interaction processes, or combinations thereof. In addition, the analytical method may be used in a single step purification process, or in a multistep purification process. UV-Vis spectrometers may be position in one or more locations in a single step or multistep purification process.

One skilled in the art will recognize that pathlength of a sample holder may change depending on the analytical process used, on the equipment, and/or on the level of dilution of the ENB. The pathlength should be long enough to ensure that the noted impurities in the ENB are detectable. The UV-Vis spectrometer should be capable of operating in the near ultraviolet region, typically 200 nm to 380 nm.

The following examples illustrate, but do not, either explicitly or by implication, limit the present invention.

EXPERIMENTAL

UV-Vis Analysis of ENB Samples

Samples of ENB to be analyzed, were carefully collected using techniques to avoid air exposure. These techniques involved the use of Leur Lock adapters that attach to the process sampling point, needles, and dried, nitrogen filled bottles, capped with rubber or Teflon lined septa. The septa were replaced in a dry-box with polypropylene-lined hard caps within hours after sampling, to protect the samples.

Figure 2:
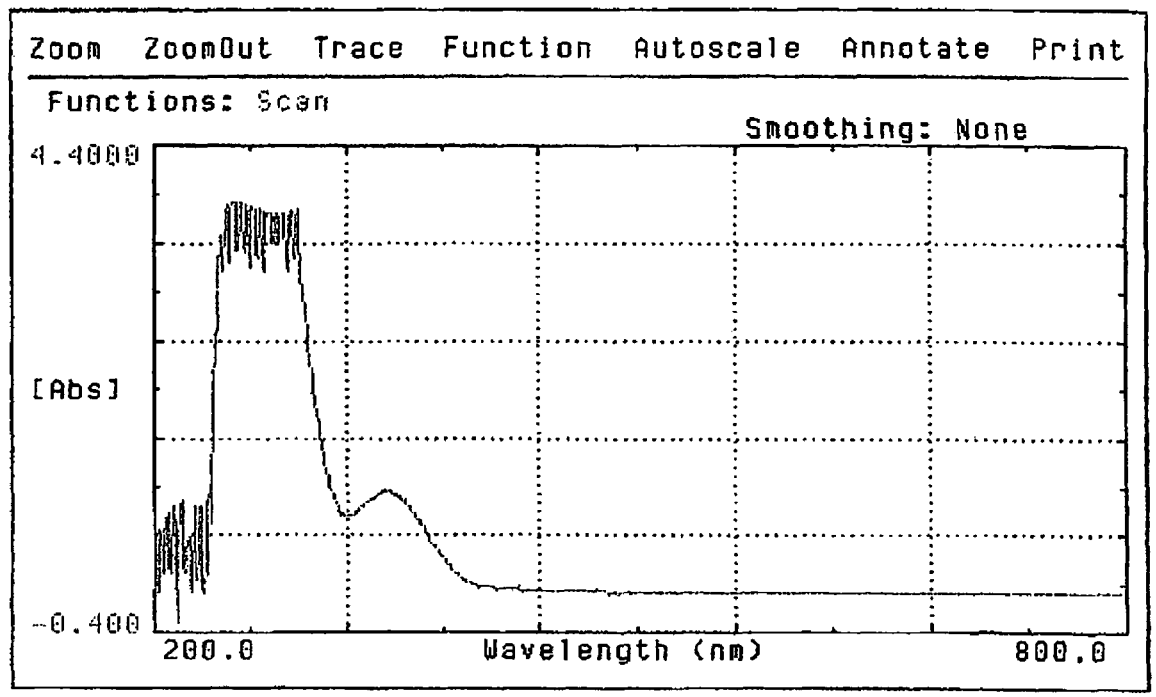
FIG. 2 is a UV-VIS absorbance spectrum of an ENB sample with relatively high levels of impurities.

UV-Vis spectra were collected on a Beckman Coulter DU® 640 Spectro-photometer. Quartz cuvettes with Teflon lined, screw on caps (obtained from VWR International, Cat. No. 14222-710) were used to hold samples. In a dry box, Isopar-E® (3 ml) was transferred into a quartz cuvette and capped. This Isopar-E® sample served as a blank (for background control). The ENB (3 ml) was loaded into a separate quartz cuvette and capped. The blank and ENB samples were brought out of the box, and their spectra collected. The spectrometer recorded a scan of the UV-Vis absorbance spectrum from about 200 nm to about 800 nm, and a numerical output reporting the absorbances at 320 nm and 343 nm was generated (the wavelengths chosen for the numerical output are set by the operator). The absorbance at 320 nm is typically on the shoulder of a peak of significantly greater intensity. The absorbance at 343 nm is typically on the maximum of a peak of significantly less intensity. The absorbance at each wavelength, 320 nm and 343 nm, is the absorbance measured at the specified wavelength, and not necessarily an absorbance associated with a peak maximum. The UV absorbances at 320 mm and 343 nm were recorded. An example of a UV-VIS absorbance spectrum is shown in FIG. 2. Any analysis which monitors UV-VIS absorbance can be used in the invention.

The reproducibility of the Beckman Coulter DU®640 Spectrophotometer and the above method were studied. Three different ENB samples, A, B and C, were used. The spectrum of the blank was collected once, and then the spectra of samples A thru C were collected. The spectra of samples A thru C were collected five more times in that order (first A, then B, then C; next A, then next B, then next C; etc.).

For each analysis, the absorbances at 320 nm and 343 nm were recorded. The results are shown in Table 1 below. As can be seen from these results, the reproducibility of the analysis was excellent, with low standard deviations (<0.007) for each series.

TABLE 1

Reproduciblity of UV-Vis Measurements

| ENB ID | Abs 320 | Abs 343 | Sum Abs |
| --- | --- | --- | --- |
| A | 0.3061 | 0.0176 | 0.3237 |
| A | 0.3061 | 0.0169 | 0.3230 |
| A | 0.3058 | 0.0174 | 0.3232 |
| A | 0.3064 | 0.0172 | 0.3236 |
| A | 0.3061 | 0.0176 | 0.3237 |
| A | 0.3058 | 0.0170 | 0.3228 |
| Mean | 0.3061 | 0.0173 | 0.3233 |
| SD (n - 1) | 0.0002 | 0.0003 | 0.0004 |
| B | 0.1520 | 0.0179 | 0.1699 |
| B | 0.1522 | 0.0182 | 0.1704 |
| B | 0.1519 | 0.0177 | 0.1696 |
| B | 0.1513 | 0.0180 | 0.1693 |
| B | 0.1514 | 0.0181 | 0.1695 |
| B | 0.1512 | 0.0174 | 0.1686 |
| Mean | 0.1517 | 0.0173 | 0.1696 |
| SD (n - 1) | 0.0004 | 0.0003 | 0.0006 |
| C | 0.5098 | 0.0396 | 0.5494 |
| C | 0.5103 | 0.0399 | 0.5502 |
| C | 0.5098 | 0.0396 | 0.5494 |
| C | 0.5098 | 0.0389 | 0.5487 |
| C | 0.5101 | 0.0396 | 0.5497 |
| C | 0.5093 | 0.0390 | 0.5483 |
| Mean | 0.5099 | 0.0394 | 0.5493 |
| SD (n - 1) | 0.0003 | 0.0004 | 0.0007 |

Correlation of UV-Vis Absorbance Sum to Catalyst Efficiencies Determined in a Batch Reactor Sample Description A number of ENB samples were collected with differing levels of UV absorbances at 320 nm and 343 nm.

The "Standard" ENB (Sample No. 6) was stored in a B-28 cylinder that had been filled from an incoming stream of ENB from an outside source. This sample was taken at a point in the feed system, after an antioxidant inhibitor had been removed from the sample. This particular sample was used as a standard ENB in a series of batch reactor polymerizations. Two samples, Sample No. 5 and Sample No. 7, of ENB, used in this correlation, were considered to be benchmarks of quality. These samples were stored under inert atmosphere.

Removal of Antioxidant Inhibitor

Some of the samples used in the correlation study were inhibited with an antioxidant inhibitor. These samples were passed through a pad of activated, neutral alumina, in a dry box, prior to their use in the batch polymerization reactions. The initial "25 ml" ENB eluate from this column purification was discarded, and samples for batch reactor testing were taken from the second "25 ml" ENB eluate. This procedure is known to reduce the concentration of antioxidant inhibitor from its typical level to undetectable levels.

Batch Reactor Results and Correlation

Aliquots of each of the ten samples, as listed in Table 2, were polymerized, each with ethylene and propylene to form an EPDM polymer. Polymerizations were performed in a solution phase, batch reactor, utilizing a standard constrained geometry catalyst (CGC) catalyst system. Each experimental sample was polymerized between runs with a standard ENB sample. The catalyst efficiency of the polymerization, using each experimental sample, was determined, and expressed as a percent of an average of the catalyst efficiencies (average of two runs) of the polymerizations using the standard sample. The batch reactor catalysts efficiencies of the experimental samples are shown in Table 2. Although, the standard was fully acceptable by the conventional analytical specifications, this sample was of suboptimal quality as shown by the fact that some experimental samples were polymerized with significantly higher catalyst efficiencies.

TABLE 2

Description of ENB Samples 1-10 and
Batch Reactor Catalyst Efficiencies

| Experimental Run | Inhibitor | Cat. Eff. (% of Std.) | UV-Vis Abs. Sum |
|---|---|---|---|
| 1 | Yes | 122 | 0.29 |
| 2 | Yes | 116 | 0.41 |
| 3 |  | 46 | 0.83 |
| 4 |  | 85 | 0.83 |
| 5 (Benchmark 1) |  | 127 | 0.18 |
| 6 |  | 98 | 0.71 |
| 7 (Benchmark 2) |  | 133 | 0.24 |
| 8 | Yes | 121 | 0.28 |
| 9 |  | 72 | 0.79 |
| 10 |  | 99 | 0.39 |

% of Std. = 100 × {(the cat. efficiency of experimental run)/(average of cat. efficiency of two standard runs, each using a standard sample of ENB, and run immediately before and immediately after, respectively, the experimental run)}

FIG. 1 below shows the correlation of the batch reactor catalyst efficiency to the sum of absorbances at 320 nm and 343 nm. The correlation equation from FIG. 1 (% Std. Catalyst Efficiency=148.4−98.89×SUM) can be used to estimate the catalyst efficiency expected from a sample of ENB, using the sum of its absorbances at 320 nm and 343 nm ($SUM=A_{320}+A_{343}$).

Since the standard ENB was of suboptimal quality, an equation predicting expected catalyst efficiency was developed, by taking, as a more desired level of efficiency, 125.2% of the catalyst efficiency generated using the standard. Thus, all of the catalyst efficiencies in Table 2 above were divided by 1.252, and the resulting indexed data was linearly fit to give the equation: % Expected Cat. Eff.=100 (1.185−0.749×SUM). Utilizing this form of the equation, an ENB which exhibits a SUM of 0.31 or less, would yield a catalyst efficiency of greater than 95% of the desired efficiency level. More preferably, an ENB sample which exhibits a SUM of 0.25 or less, would yield a catalyst efficiency of greater than 99.7% of the desired efficiency level. Most preferably, an ENB sample which exhibits a SUM of 0.18 or less, would yield a catalyst efficiency of greater than 105% of desired efficiency level.

Although the invention has been described in certain detail through the preceding specific embodiments, this detail is for the primary purpose of illustration. Many variations and modifications can be made by one skilled in the art, without departing from the spirit and scope of the invention, as described in the following claims.

What is claimed:

1. A process of polymerizing a mixture comprising ethylene, at least one α-olefin and 5-ethylidene-2-norbornene, said process comprising polymerizing the ethylene and the at least one α-olefin in the presence of 5-ethylidene-2-norbornene, which comprises low levels of impurities, as determined by the UV absorbances at the following wavelengths: 320 nm and 343 nm, in a neat sample of the 5-ethylidene-2-norbornene, contained in a quartz sample holder with a one centimeter pathlength; and
    wherein 5-ethylidene-2-norbornene is monitored by UV absorbance, and wherein the 5-ethylidene-2-norbornene having a sum of absorbances, at 320 nm and 343 nm, less than, or equal to, 0.31, is selected for polymerization.

2. The process of claim 1, wherein the sum of the absorbances at 320 nm and 343 nm is less than, or equal to, 0.25.

3. The process of claim 1, wherein the sum of the absorbances at 320 nm and 343 nm is less than, or equal to, 0.18.

4. The process of claim 1, wherein the α-olefin is selected from the group consisting of $C_3$-$C_{20}$ α-olefins, $C_3$-$C_{12}$ α-olefins, and $C_3$-$C_8$ α-olefins.

5. The process of claim 1, wherein the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene.

6. The process of claim 1, wherein the polymerization takes place in solution.

7. The process of claim 1, wherein the polymerization takes place in the gas phase.

8. The process of claim 1, wherein the polymerization takes place in the presence of at least one constrained geometry catalyst.

9. A method of increasing a catalyst's efficiency in a polymerization of a mixture comprising ethylene, at least one α-olefin and 5-ethylidene-2-norbornene, said method comprising polymerizing the ethylene and the at least one α-olefin in the presence of the 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and
    wherein 5-ethylidene-2-norbornene is monitored by UV absorbance, and wherein the 5-ethylidene-2-norbornene having a sum of absorbances, at 320 nm and 343 nm, less than, or equal to, 0.31, is selected for polymerization.

10. The method of claim 9, wherein the sum of the absorbances at 320 nm and 343 nm is less than, or equal to, 0.25.

11. The method of claim 9, wherein the sum of the absorbances at 320 nm and 343 nm is less than, or equal to, 0.18.

12. The method of claim 9, wherein the α-olefin is selected from the group consisting of $C_3$-$C_{20}$ α-olefins, $C_3$-$C_{12}$ α-olefins, and $C_3$-$C_8$ α-olefins.

13. The method of claim 9, wherein the α-olefin is selected from the group consisting of propylene, 1-butene, 2-methyl-1-propene, 1-pentene, 2-methyl-1-butene, 1-hexene, 4-methyl-1-pentene, 1-heptene, and 1-octene.

14. The method of claim 9, wherein the polymerization takes place in solution.

15. The method of claim 9, wherein the polymerization takes place in the gas phase.

16. The method of claim 9, wherein the polymerization takes place in the presence of at least one constrained geometry catalyst.

17. A method of purifying 9-ethylidene-2-norbornene, said method comprising thermally treating said 5-ethylidene-2-norbornene, optionally under reduced pressure, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and
    wherein the sum of the absorbances at 320 nm and 343 nm is less than, or equal to, 0.31.

18. The method of claim 17, wherein the sum of the absorbances at 320 nm and 343 nm is less than, or equal to, 0.25.

19. The method of claim 17, wherein the sum of the absorbances at 320 nm and 343 nm is less than, or equal to, 0.18.

20. A method for determining the "percent expected catalyst efficiency" for a polymerization of a mixture, said mixture comprising ethylene, propylene and 5-ethylidene-2-norbornene, said method comprising:
    (1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and (2) calculating the "percent expected catalyst efficiency (% Expected Cat. Eff.) according to the following equation: % Expected Cat. Eff.=100×(1.185−0.749×SUM).

21. The method of claim 20, wherein the polymerization takes place in a batch reactor.

22. The method of claim 20, wherein the sum of the absorbances at 320 nm and 343 nm is less than, or equal to, 0.31.

23. The method of claim 20, wherein the sum of the absorbances at 320 nm and 343 nm is less than, or equal to, 0.25.

24. The method of claim 20, wherein the polymerization takes place in solution.

25. The method of claim 20, wherein the polymerization takes place in the gas phase.

26. The method of claim 20, wherein the polymerization takes place in the presence of at least one constrained geometry catalyst.

27. A method for determining the "percent expected catalyst efficiency" for a polymerization of a mixture, said mixture comprising ethylene, an α-olefin and 5-ethylidene-2-norbornene, said method comprising:

(1) measuring, in a neat sample of the 5-ethylidene-2-norbornene, contained in a quartz sample holder with a one centimeter pathlength, the level of impurities at the following UV absorbances: 320 nm and 343 nm, and determining the sum (SUM) of these two absorbances, and (2) determining the "percent expected catalyst efficiency (% Expected Cat. Eff.) according to the following equation: % Expected Cat. Eff.=100×(A−B×(SUM)), wherein the coefficients A and B are calculated from a linear regression of measured catalyst efficiencies from polymerization reactions, using 5-ethylidene-2-norbornene of varying summations (SUMS) of the UV absorbances at 320 nm and 343 nm.

28. The method of claim 27, wherein the polymerization takes place in a batch reactor.

29. The method of claim 27, wherein the sum of the absorbances at 320 nm and 343 nm is less than, or equal to, 0.31.

30. The method of claim 27, wherein the sum of the absorbances at 320 nm and 343 nm is less than, or equal to, 0.25.

31. The method of claim 27, wherein the polymerization takes place in solution.

32. The method of claim 27, wherein the polymerization takes place in the gas phase.

33. The method of claim 27, wherein the polymerization takes place in the presence of at least one constrained geometry catalyst.

34. A method of purifying 5-ethylidene-2-norbornene, said method comprising passing the 5-ethylidene-2-norbornene through a column, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter path length, and wherein the sum of the absorbances at 320 nm and 343 nm is less than, or equal to, 0.31.

35. A method of purifying 5-ethylidene-2-norbornene, said method comprising chemically treating the 5-ethylidene-2-norbornene, to form a purified 5-ethylidene-2-norbornene, which comprises low levels of impurities, as determined by the absorbances at the following wavelengths: 320 nm and 343 nm, in a neat sample of the 5-ethylidene-2-norbornene, contained in a quartz sample holder with a one centimeter pathlength, and wherein the sum of the absorbances at 320 nm and 343 nm is less than, or equal to, 0.31.

36. The process of claim 1, wherein the polymerization takes place in the presence of at least one single-site catalyst.

37. The process of claim 1, wherein the polymerization takes place in the presence of at least one multiple-site-site catalyst.

38. The method of claim 9, wherein the polymerization takes place in the presence of at least one single-site catalyst.

39. The method of claim 9, wherein the polymerization takes place in the presence of at least one multiple-site-site catalyst.

40. The method of claim 20, wherein the polymerization takes place in the presence of at least one single-site catalyst.

41. The method of claim 20, wherein the polymerization takes place in the presence of at least one multiple-site catalyst.

42. The method of claim 27, wherein the polymerization takes place in the presence of at least one single-site catalyst.

43. The method of claim 27, wherein the polymerization takes place in the presence of at least one multiple-site catalyst.

* * * * *